United States Patent
Kadota

(10) Patent No.: US 6,870,633 B1
(45) Date of Patent: Mar. 22, 2005

(54) PRINTING DEVICE

(75) Inventor: Masatoshi Kadota, Takahama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/506,960

(22) Filed: Feb. 18, 2000

Related U.S. Application Data

(62) Division of application No. 08/941,027, filed on Sep. 30, 1997.

(30) Foreign Application Priority Data

Sep. 30, 1996 (JP) .......................................... P8-280333

(51) Int. Cl.⁷ ............................ G06F 15/00; G06K 1/00
(52) U.S. Cl. ..................... 358/1.13; 358/1.15; 358/1.17; 358/3.3; 358/536
(58) Field of Search ............................... 358/1.11, 1.15, 358/1.17, 3.3, 536

(56) References Cited

U.S. PATENT DOCUMENTS

| | | | | |
|---|---|---|---|---|
| 5,359,673 A | * | 10/1994 | de La Beaujardiere | 382/229 |
| 5,367,618 A | * | 11/1994 | Ishida | 358/1.11 |
| 5,465,326 A | * | 11/1995 | Sawada | 358/438 |
| 5,471,563 A | | 11/1995 | Dennis et al. | 358/1.15 |
| 5,537,221 A | * | 7/1996 | Sawada | 358/450 |
| 5,555,435 A | | 9/1996 | Campbell et al. | 395/800 |
| 5,586,227 A | | 12/1996 | Kawana et al. | 395/112 |
| 5,604,846 A | | 2/1997 | Kadota | 358/1.15 |
| 5,671,341 A | * | 9/1997 | Kashiwazaki et al. | 358/1.13 |
| 5,673,119 A | * | 9/1997 | Murata | 358/1.9 |
| 5,825,993 A | * | 10/1998 | Shimura et al. | 358/1.16 |
| 5,867,637 A | | 2/1999 | Uekusa | 395/112 |
| 5,881,168 A | | 3/1999 | Takaoka et al. | 382/180 |
| 5,903,360 A | * | 5/1999 | Honma et al. | 358/450 |
| 5,917,507 A | * | 6/1999 | Sakurai | 345/467 |
| 6,384,926 B2 | * | 5/2002 | Mochizuki | 358/1.14 |
| 6,388,757 B1 | * | 5/2002 | Koga | 358/1.1 |

FOREIGN PATENT DOCUMENTS

| | | |
|---|---|---|
| JP | 06-044015 | 2/1994 |
| JP | 08-174956 | 7/1996 |

* cited by examiner

*Primary Examiner*—Kimberly Williams
*Assistant Examiner*—Ashanti Ghee
(74) *Attorney, Agent, or Firm*—McGinn & Gibb, PLLC

(57) ABSTRACT

The printer driver receives print data from an application software program. When the received print data is font data, the printer driver transmits the font data as it is to the printer. When the print data is other than font data, but is vector data, for example, the printer driver converts the received data into bitmap data of the host-based-type format. The printer driver then transfers the converted print data to the printer. In the printer, when the received print data is bitmap data, information on the bitmap data is registered in a packet structure, and is then set in a development buffer. When the received print data is font data, on the other hand, the font data is registered in the packet structure. The font data is then developed into bitmap data, and then set over the already-set bitmap data in the development buffer. Thus, composite bitmap data is created and printed out.

12 Claims, 10 Drawing Sheets

FIG. 8    S4000

PRINTING DEVICE

This application is a divisional of Ser. No. 08/941,027 filed on Sep. 30, 1997.

BACKGROUND OF THE INVENTION

1. Field of the Invention

The present invention relates to a printing system comprised of a print data transmission device and a printing device, wherein the print data transmission device receives print data from an application program and transmits the print data to the printing device, the printing device performing a printing operation based on the received print data.

2. Description of the Related Art

Conventionally, there are two different types of printing devices. A first type of printing device is designed for receiving, from a host computer, language expression data which describes images in a page description language (which will be referred to as PDL hereinafter). One example of the PDL is PCL, a registered trademark of Hewlett-Packard Company. The printing device of this type interprets the received language expression data and develops the language expression data into bitmap data for printing. This type of printing device will be referred to as intelligent-type printing device hereinafter.

A second type of printing device is designed to receive either compressed or uncompressed image data (bitmap data) from a host computer. When the received data is compressed, the printing device decompresses or expands the received data for printing. When the received data is not compressed, the printing device directly performs printing operation by the received data. This type of printing device will be referred to as host-based-type printing device hereinafter.

Since data for the intelligent-type printing device is expressed in language expressions, the amount of data transmitted from the host is small. This is advantageous when using an interface having a low communication speed. However, this type of printing device has to interpret the received language expressions and create corresponding bitmap image data. Accordingly, a large processing load is placed on the printing device. As a result, the printing operation itself becomes not very fast. It takes a quite long period of time to develop language expression data into bitmap data particularly when the language expression data is described by vectors. The intelligent-type printing device may not print vector graphics within a short period of time.

On the other hand, the host-based-type printer can print received bitmap data within a short period of time. The bitmap data has been originally created by a high-speed graphics accelerator provided in the host computer. When the bitmap data is compressed, the host-based-type printer expands or decompresses the compressed bitmap data. When decompressing the bitmap data, the printer does not use any software program process such as COMDEC, but uses a hardware logic circuit to quickly decompress the compressed bitmap data. However, because the host-based-type does not use software, unlike the intelligent-type device, the host-based-type may not increase the amount of an unused area of the memory by recompressing the bitmap data. As a result, the host-based-type printing device occasionally has an insufficient memory area to form an entire image.

SUMMARY OF THE INVENTION

In view of the problems described above, an object of the present invention is to provide an improved intelligent-type printing device in which the processing load for creating bitmap data is decreased to prevent a decline in printing speed.

In order to attain the above and other objects, the present invention provides a printing device capable of receiving print data from an external source and printing the print data, the printing device comprising: input means capable of receiving, from an external source, print data in the form of both language expression data which describes images in a language and bitmap image data expressing images with bitmap images, the print data representing images of several print areas desired to be printed; packet memory means for preparing several packet registration areas each capable of managing the received print data representing an image of a corresponding print area in the form of both the language expression data and the bitmap image data; packet registration means capable of registering the received language expression data for each print area in a corresponding packet registration area; memory means for storing a print data area for each of the predetermined several print areas; first writing means for writing the received bitmap image data for each print area into the corresponding print data area as first bitmap image data; second writing means for converting the language expression data for each print area registered in the corresponding packet registration area into second bitmap data and for writing the second bitmap data into the corresponding print data area, thereby combining the first and second bitmap image data into bitmap print data for each print area; and printing means for printing the desired image based on the bitmap print data produced in the print data areas.

The printing device may further comprise bitmap data memory means for preparing several bitmap data memory areas each being capable of storing the received bitmap image data for a corresponding print area. The packet registering means may register information on the bitmap data memory area stored with the received bitmap image data for each print area in the corresponding packet registration area. The first writing means may write the bitmap image data for each print area stored in the corresponding bitmap data memory area into the corresponding print data area as the first bitmap image data.

According to another aspect, the present invention provides a print data transmission device for transmitting print data to a printing device, the device comprising: input means for receiving print data issued from an application program; transmission means capable of transmitting, to a printing device, the print data in the form of both language expression data describing images in a language and bitmap image data expressing images with bitmap images; judging means for judging whether or not the received print data is of a first type which is capable of being expressed as language expression data to be developed into bitmap data at a first condition; converting means for converting the received print data into bitmap data when the print data is of the first type; memory means for temporarily storing the converted print data and non-converted print data; and transmission control means for controlling the transmission means to transmit, to the printing device, the converted print data and the non-converted print data.

The judging means may judge that print data represented in vectors and capable of being described in a language is of the first type, the converting means converting the print data into bitmap data. The judging means may judge that print data represented in font data is of a second type different from the first type, the converting means not converting the print data into bitmap data. The first type of print data is developed into bitmap data at the first condition, and the second type of print data is developed into bitmap data at a second condition different from the first condition.

According to still another aspect, the present invention provides a printing device capable of receiving print data from an external source and printing the print data, the printing device comprising: input means for receiving, from an external source, print data in the form of bitmap image data expressing images with bitmap images; bitmap data memory means for storing the received print data; judging means for judging whether or not the bitmap data memory means successfully stores newly-received print data; memory area increasing means for increasing the amount of the memory area available for storing the newly-received bitmap image data when the judging means judges that the bitmap data memory means fails to store the newly-received print data; and printing means for printing the desired image based on the print data stored in the bitmap data memory means.

The print data may represent images of several print areas desired to be printed. In this case, the bitmap data memory means may prepare a bitmap data memory area for storing the received bitmap image data for a corresponding print area. The judging means may judge whether or not the bitmap data memory means successfully prepares one bitmap data memory area for storing newly-received bitmap image data. The memory area increasing means may increase the amount of the memory area available for preparing a bitmap data memory area for the newly-received bitmap image data when the judging means judges that the bitmap data memory means fails to prepare the memory area for storing the newly-received bitmap image data. The memory area increasing means may include means for decreasing the resolution of the bitmap print data already stored in the bitmap data storing means, thereby increasing the memory area available for storing the newly-received print data. The resolution decreasing means may include means for thinning the print data.

According to a further aspect, the present invention provides a program storage medium for storing data of a program indicative of controlling a printing device to receive print data from an external source and to print the print data, the program comprising: a program of receiving, from an external source, print data in the form of both language expression data which describes images in a language and bitmap image data expressing images with bitmap images, the print data representing images of several print areas desired to be printed; a program of preparing several packet registration areas each capable of managing the received print data representing an image of a corresponding print area in the form of both the language expression data and the bitmap image data; a program of registering the received language expression data for each print area in a corresponding packet registration area; a program of writing the received bitmap image data for each print area into a corresponding print data area as first bitmap image data; a program of converting the language expression data for each print area registered in the corresponding packet registration area into second bitmap data and writing the second bitmap data into the corresponding print data area, thereby combining the first and second bitmap image data into bitmap print data for each print area; and a program of printing the desired image based on the bitmap print data produced in the print data areas.

According to still another aspect, the present invention provides a program storage medium for storing data of a program indicative of a process for controlling a print data transmission device to transmit print data to a printing device, the program comprising: a program of receiving print data issued from an application program; a program of judging whether or not the received print data is of a first type which is capable of being expressed as language expression data to be developed into bitmap data at a first condition; a program of converting the received print data into bitmap data when the print data is of the first type; a program of temporarily storing the converted print data and non-converted print data; and a program of transmitting, to the printing device, the converted print data and the non-converted print data.

DETAILED DESCRIPTION OF THE PREFERRED EMBODIMENT

Figure 1:
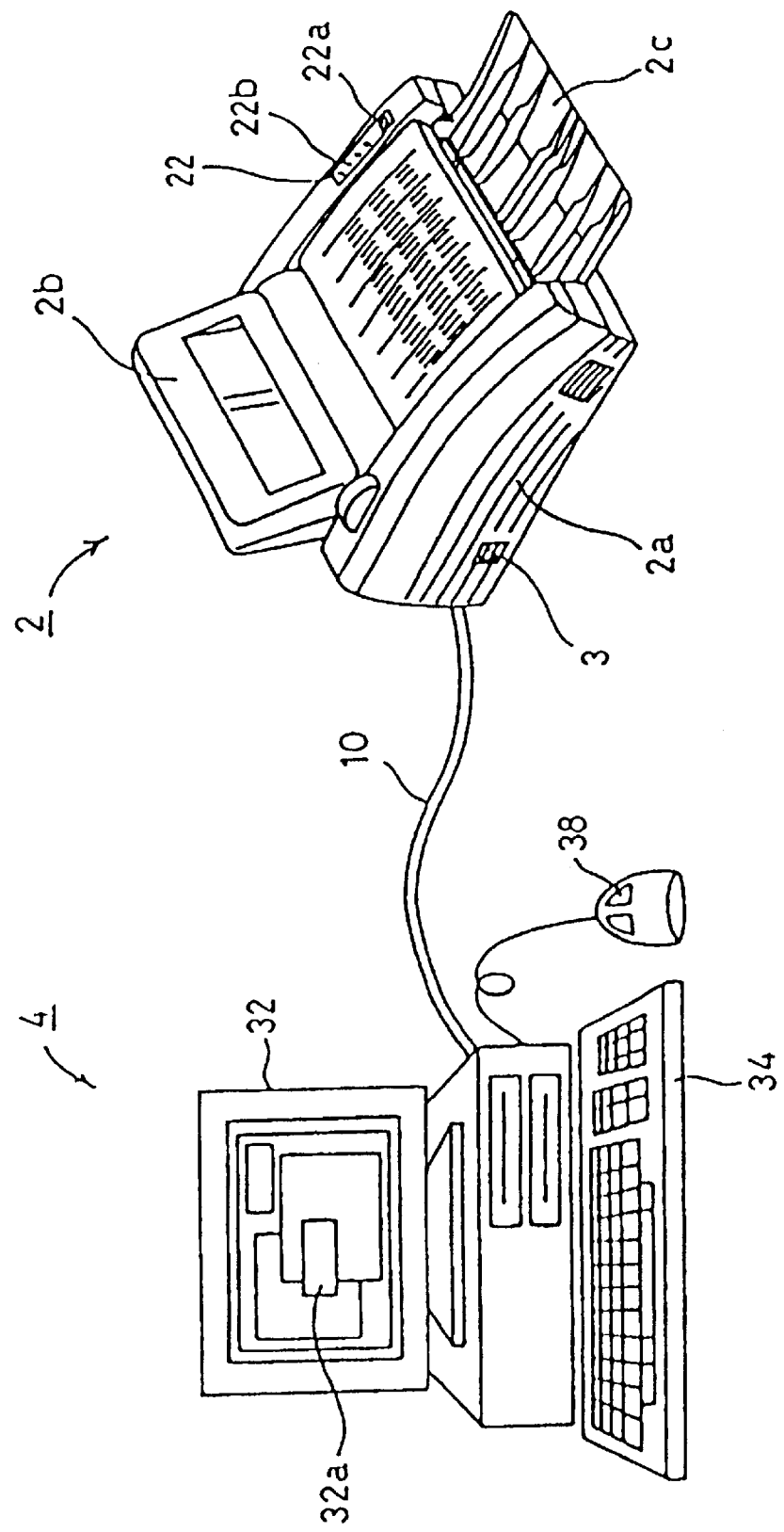
FIG. 1 is an explanatory diagram showing the state in which a personal computer and a laser printer, both according to the embodiment of the present invention, are connected together.

A printer system according to a preferred embodiment of the present invention will be described while referring to the accompanying drawings wherein like parts and components are designated by the same reference numerals.

Figure 2:
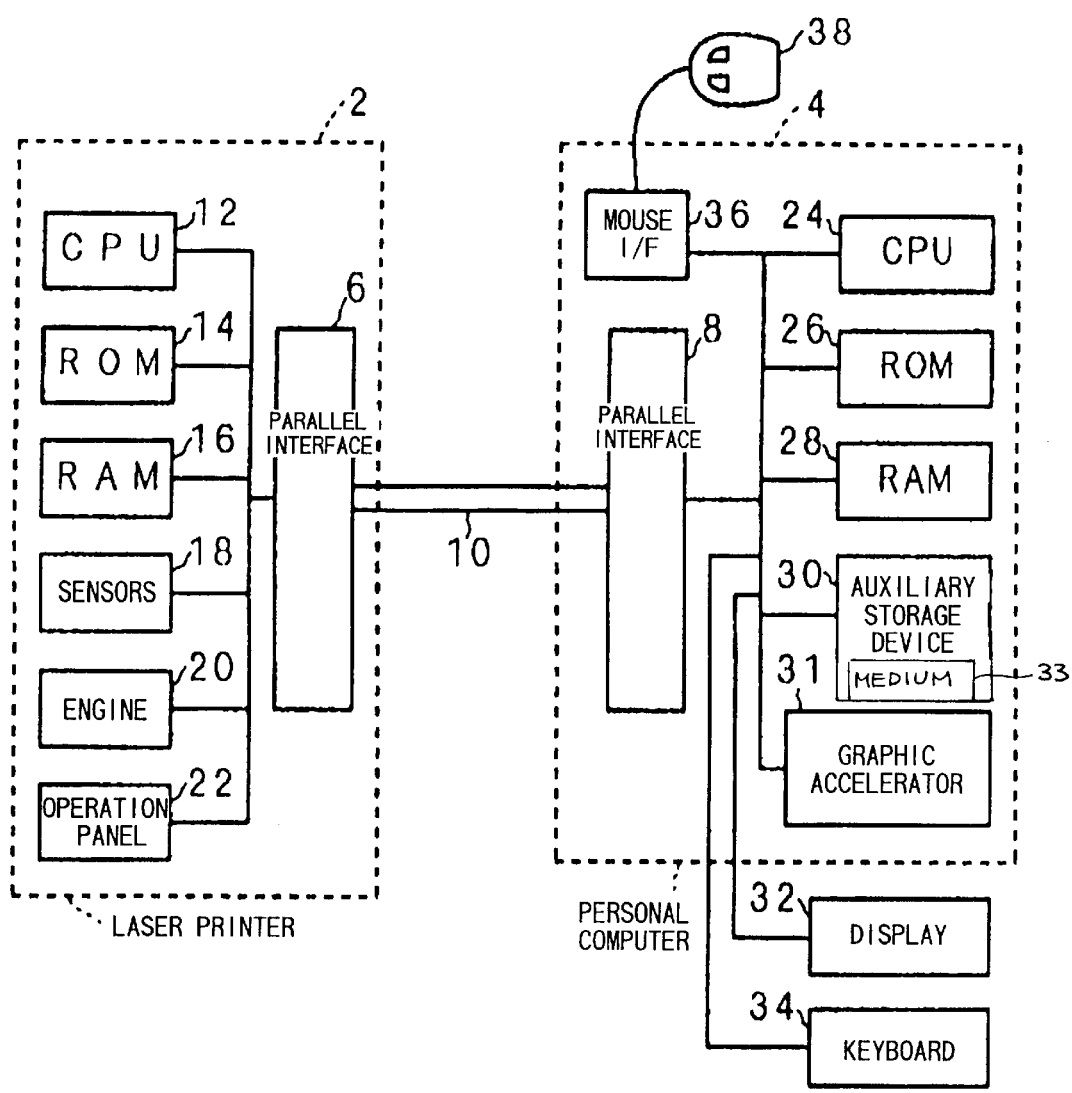
FIG. 2 is a block diagram for the personal computer and the laser printer of the embodiment.

FIGS. 1 and 2 show the printing system of the present embodiment. In the printing system, a host computer such as a personal computer 4 is connected to a laser printer 2 by a parallel printer cable 10 via interface units 6 and 8.

The laser printer 2 includes a main body 2a, a paper feed unit 2b, and a paper discharge tray 2c. During the printing process, one sheet of paper is fed at a time from the paper feed unit 2b into an image forming unit (not shown). A print head (not shown), installed inside the main body 2a, forms an electrostatic latent image on a transfer roller. The electrostatic latent image is developed by toner and transferred onto the sheet of paper. The toner image is then thermally fixed to the sheet of paper. Then, the paper is discharged onto the paper discharge tray 2c.

Internally, the printer 2 includes the interface unit 6 for interfacing with the personal computer 4 in accordance with a predetermined printer parallel interface standard such as a standard "IEEE 1284"; a CPU 12 for executing various processes according to various control programs; a ROM 14 storing various print control programs including programs of FIGS. 4 through 9; a RAM 16 for use as a work area for calculations to be executed by the CPU 12, for storing results of those calculations and various settings, and for preparing bitmap memory areas for storing received bitmap image data, a packet structure memory area for storing a packet structure for each page's worth of received print data, and memory areas for preparing development buffers; various sensors 18, including a paper feed sensor, a paper discharge sensor, and a toner remaining amount sensor; and an engine 20 including a main motor for driving mechanical portions in the printer 2. A control unit 22 and a power switch 3 are also provided in the main body 2a of the printer 2 as shown in FIG. 1. These components 12, 14, 16, 18, 20, and 22 are connected to the interface 6 via bus line. The control unit 22 includes a push-button switch 22a for providing simple instructions to the laser printer 2, and LED lights 22b for displaying the status of instruction controls to allow the user to set prescribed conditions.

The personal computer 4 includes the interface unit 8; a CPU 24; a ROM 26; a RAM 28; an auxiliary storage unit 30; a graphic accelerator 31; a color display 32; a keyboard 34; and a mouse interface 36 which are connected to one another via bus line. An input device (mouse) 38 is connected to the mouse interface 36.

The interface unit 8 is for interfacing with the laser printer 2 in accordance with the predetermined parallel interface standard. The CPU 24 is for executing various processes according to various control programs stored in the ROM 26 and the RAM 28. The ROM 26 stores therein various control programs. The auxiliary storage unit 30 is constructed from a disk driver, for example, for retrieving data and external programs from an auxiliary storage medium 33 such as floppy disks, CD-ROMs, magnetooptical disks, and the like. The external programs include an operating system program, application programs, and a printer device driver program. The RAM 28 is for temporarily storing therein data and programs such as the operating system program, the application programs, and the printer device driver program, which are read by the auxiliary storage unit 30 from the storage medium 33 when these programs are to be executed. The RAM 28 is also for storing various settings and results of calculations attained by the CPU 24. For example, the RAM 28 is prepared with a font data memory area for temporarily storing font data and a bitmap data memory area for temporarily storing bitmap data.

The graphic accelerator 31 is for converting, into bitmap data, image data created in a format determined according to the operating system executed in the computer 4. The display 32 is for displaying calculated results, menus, and a status monitor of the printer 2, and the like. The keyboard 34 is for enabling a user to input various instructions. The mouse input device 38 is for moving a mouse cursor displayed on the display 32 and for allowing the user to input instructions. The mouse unit 38 is for communicating data and instructions with the CPU 24 via the mouse interface 36.

The personal computer 4 and the laser printer 2 exchange, through a control line in the IEEE 1284 cable 10, handshake signals needed for transmitting data. The handshake signals include strobe signals and acknowledge signals. The personal computer 4 transmits instruction commands, bitmap data, and language expression data defined according to the page description language (PDL) to the printer 2 through a data line in the IEEE 1284 cable 10. The above-described operations are performed based on the printer driver program which is retrieved from the auxiliary storage unit 30 and executed by the CPU 24. When the printer 2 is in a type which can execute bi-directional communication, the printer 2 executes printing processes according to the received instruction commands and data, and outputs its status data to the personal computer 4 in the form of status signals. When receiving the status signals, the computer 4 controls the color display 32 to display the status monitor in its status monitor display portion 32a.

Figure 3:
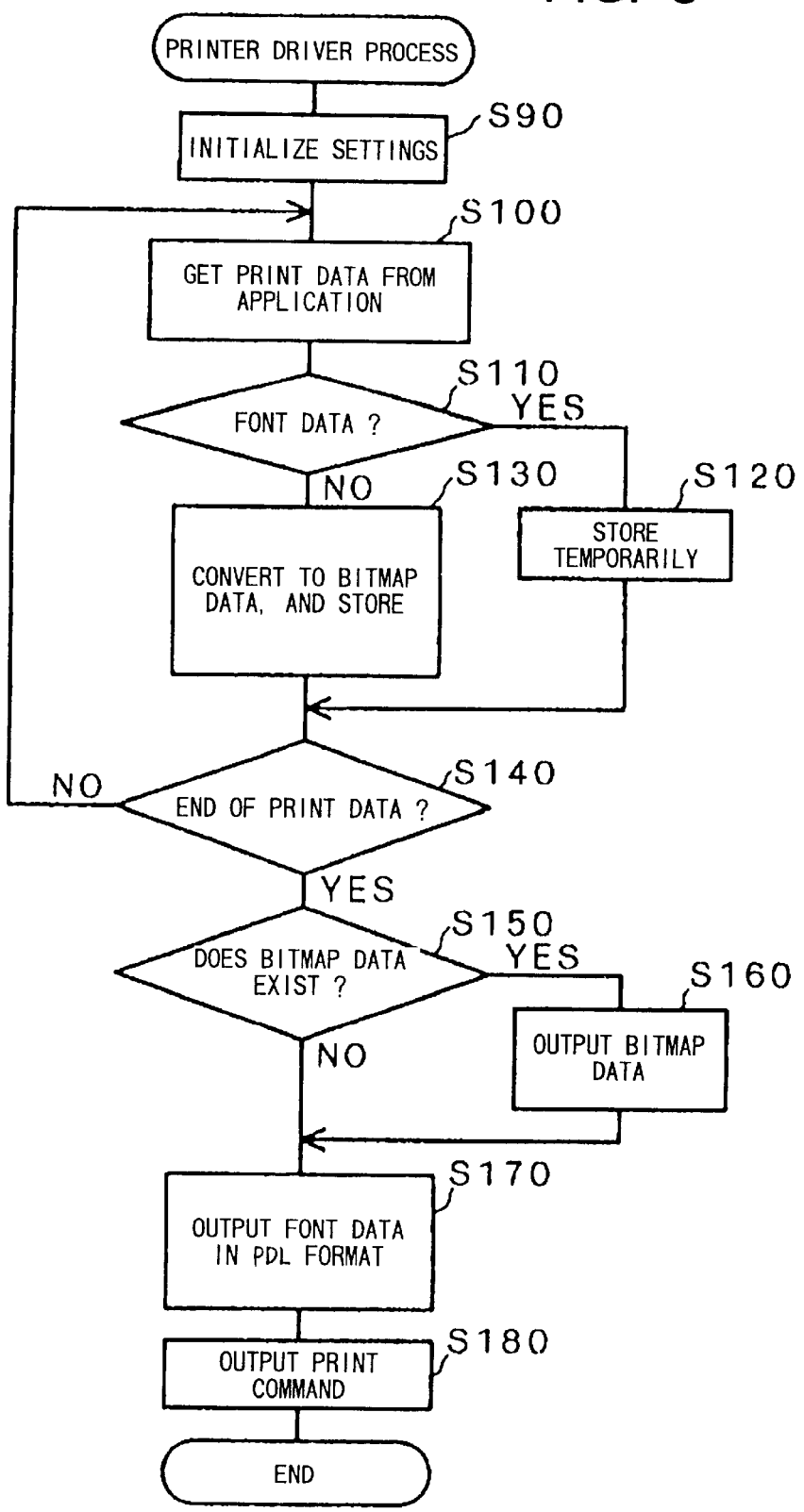
FIG. 3 is a flowchart showing a printer driver process executed in the personal computer.
Figure 4:
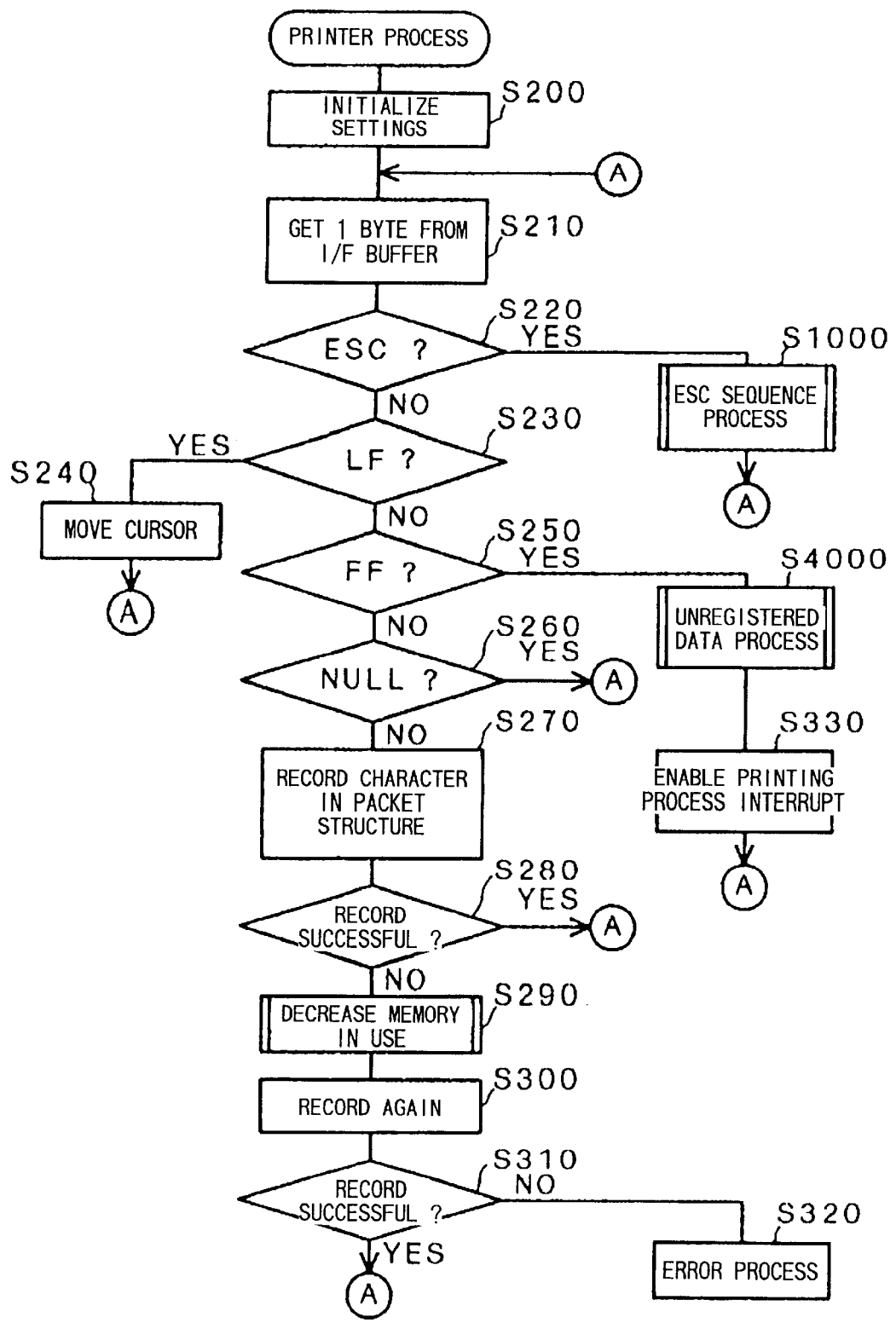
FIG. 4 is a flowchart showing a printer process executed in the laser printer.

The flowchart in FIG. 3 shows the process of the printer driver program which is loaded from the data storage medium 33 by the auxiliary storage device 30 and which is executed by the CPU 24. This process is started when an application program executed on the same CPU 24 issues a printing request.

At the beginning of the process, settings are first initialized in S90 to prepare for transmission and reception of print data. Then, in S100, print data indicative of an image desired to be printed is received from the application program. The CPU 24 determines in S110 whether the print data is font data which expresses types and styles of characters to be printed. When the print data is font data ("yes" in S110), the data is stored temporarily in the font data memory area of the RAM 28 in S120.

When the print data is not font data ("no" in S110), but rather vector data, other graphics data, or image data, the graphics accelerator 31 is controlled in S130 to convert the data into bitmap data. The bitmap data is then temporarily stored in the bitmap memory area of the RAM 28. It is noted that the graphics accelerator 31 creates the bitmap data in the same manner as the conventional host computers create bitmap data for the host-based-type printing devices. The bitmap data created in S130 will be referred to as bitmap data of the host-based-type printer (HBP) format hereinafter. This bitmap data creating process of S130 is executed at a high speed.

After the process of S120 or S130 is completed, the CPU 24 determines in S140 whether or not all the print data has been received from the application program. If any print data has not yet been received ("no" in S140), the processes from S100 to S120 or S100 to S130 are repeated. During this cycle, all of the received font data is stored in the font data memory area of the RAM 28 and all of the converted bitmap data in the host-based format is stored in the bitmap data memory area of the RAM 28.

When all the print data has been processed ("yes" in S140), the CPU 24 determines in S150 whether any bitmap data has been stored in the bitmap data memory area. If some bitmap data has been stored in the bitmap data memory area through the process of S130 ("yes" in S150), the bitmap data is compressed and outputted to the laser printer 2 in S160. It is noted that the bitmap data represents a background image portion of the image desired to be printed. Accordingly, the bitmap data is outputted to the laser printer 2 prior to the font data, thereby allowing the laser printer 2 to create in the RAM 16 bitmap data for the background image portion.

It is also noted that the bitmap data is compressed in S160 with a conventional compression format which is used also in conventional host computers to transmit bitmap data to host-based-type printing devices. More specifically, the CPU 24 compresses the bitmap data through converting, into a single set of data, a successive series of byte data which are repeatedly arranged in a horizontal direction and through converting, into another single set of data, another successive series of data of the same values which are arranged in a vertical direction. This compression format will be referred to as HBP (host-based-type printer) compression format hereinafter. To notify the laser printer 2 of this compression format, an escape sequence "<ESC> HBP" (graphics compression mode setting command) is included at the head of the compressed bitmap data to indicate that the compression format is the HBP format. It is noted that the escape sequence "<ESC> HBP" is comprised of a series of characters representing the command indicating that the compression format is the HBP format.

Next, in S170, the font data temporarily stored in the font data memory is converted into print data of a page description language (PDL) format and outputted to the laser printer 2. The print data of the PDL format is configured from font data and codes indicative of locational coordinates and font styles, for example, of characters to be printed. After all the bitmap data and font data for one page is outputted to the laser printer 2 in this manner, an FF command is outputted in S180 to indicate a Print instruction. Then, the printer driver process ends. The entire process is repeated when the next page of data is transmitted from the application program.

One example of the structure of the print data, outputted to the laser printer 2 as a result of the process described above, is shown in FIG. 10. The print data is for an entire image of a single page desired to be printed. The entire image is comprised of several bands or sections, each band being comprised of a specified number (128, for example) of raster lines. In this example, the print data is comprised of: a graphics compression mode setting command "<ESC> HBP"; a successive series of graphic data; a successive series of PDL language expression data; and a FF command. The successive series of graphic data is comprised of one or more sets of bitmap data which indicate one or more raster lines. The bitmap data is compressed in the HBP compression format as indicated by the graphics compression mode setting command "<ESC> HBP" which is outputted before the graphics data. The one or more raster lines, indicated by the bitmap data, constitute background images on the corresponding raster sections in one or more band(s) in the entire image. The successive series of PDL language expression data is comprised of one or more sets of font data indicative of one or more characters to be printed within one or more bands of the entire image.

Next, the process of the laser printer 2 will be described with reference to the flowcharts in FIGS. 4 through 9. In this printer process, print data is managed separately for each of the several bands of one page.

After initializing the settings in S200, one byte of data received from the personal computer 4 is acquired in S210 at a buffer (not shown) provided to the parallel interface 6. The CPU 12 judges in S220 whether or not the received one-byte of data is an escape (ESC) code "1b", which indicates the beginning of an escape sequence. The escape sequence is comprised of a series of characters representative of a corresponding command. When the data is an ESC code ("yes" in S220), then an escape sequence process is executed in S1000.

Figure 5:
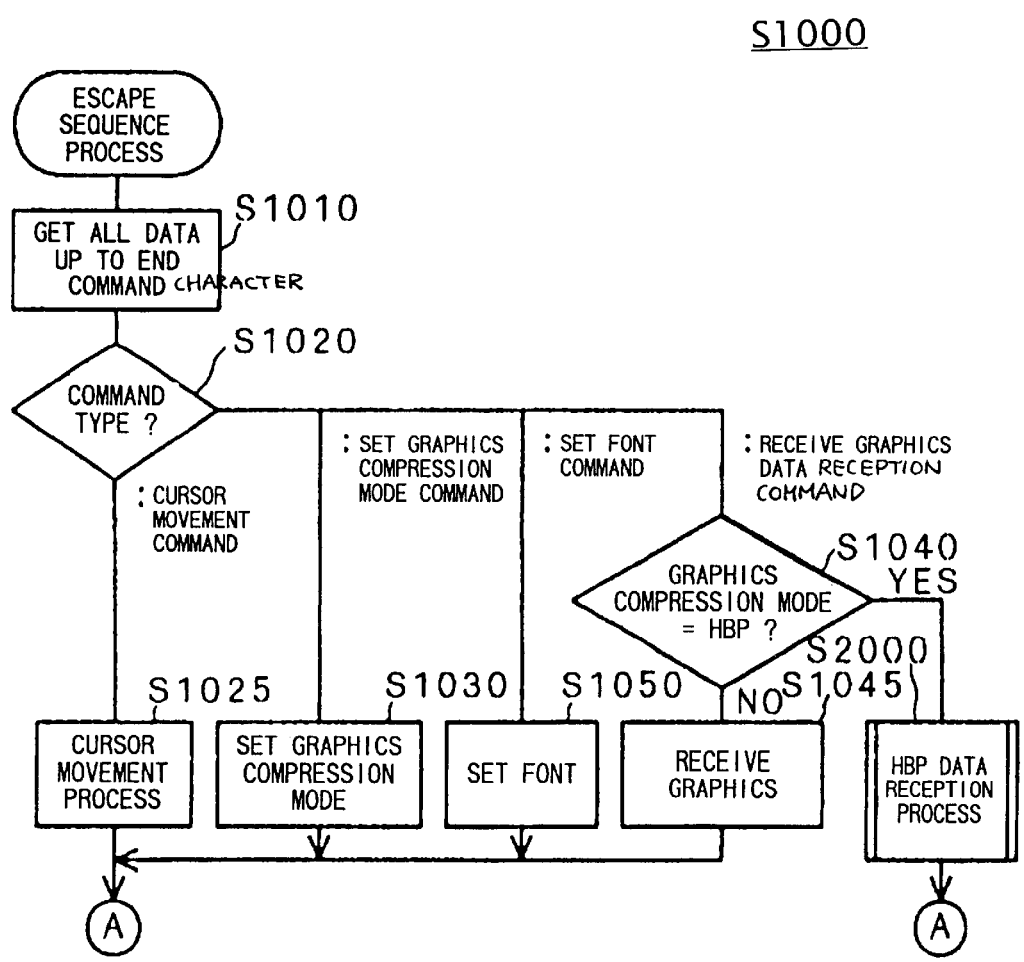
FIG. 5 is a flowchart showing an escape sequence process executed in the laser printer.
Figure 10:
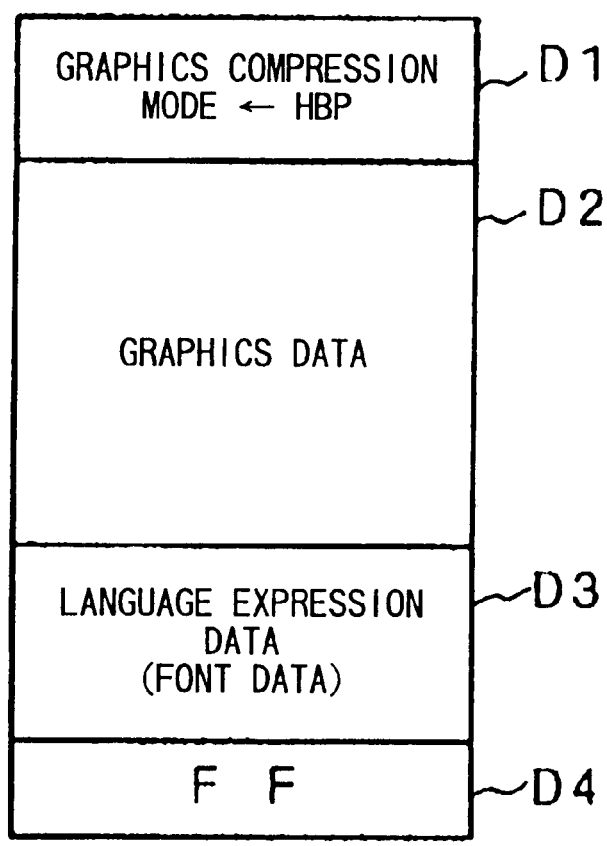
FIG. 10 is an explanatory diagram showing the structure of print data outputted by the printer driver.

When the escape sequence process is started, as shown in FIG. 5, all character data up to the end of the escape sequence is received in S1010. Then, the type of the command represented by the escape sequence is determined in S1020. For example, if the print data shown in FIG. 10 is received from the personal computer 4, the graphics compression mode setting command "<ESC> HBP" (indicated by D1 in the figure) is first received. Accordingly, a graphics compression mode setting process is performed in S1030. The graphics compression mode setting command "<ESC> HBP" indicates that the graphics compression mode should be set to the HBP format for the host-based-type printer. Accordingly, in S1030, the graphics compression mode is set to HBP, that is, the same compression method as is used for compressing bitmap data before transmitting the bitmap data to conventional host-based-type printers. Then, the program returns to S210.

Then, in S210, one byte of graphics data from the area indicated by D2 in FIG. 10 is received. It is noted that a graphics data reception command in the form of an escape sequence is set at the head of each raster line's worth of graphics data D2. Accordingly, every time a raster line's worth of graphics data is received, the judgment in S220 becomes affirmative, and the program proceeds from S220 to S1000. Then, the escape sequence process of FIG. 5 is again executed. In S1020, the CPU 12 determines that the present command is a graphics data reception command. Accordingly, the CPU 12 judges in S1040 whether the graphics compression mode has been set to HBP. Because the compression mode has been set to HBP in this example ("yes" in S1040), a host-based data reception process is executed in S2000.

Figure 6:
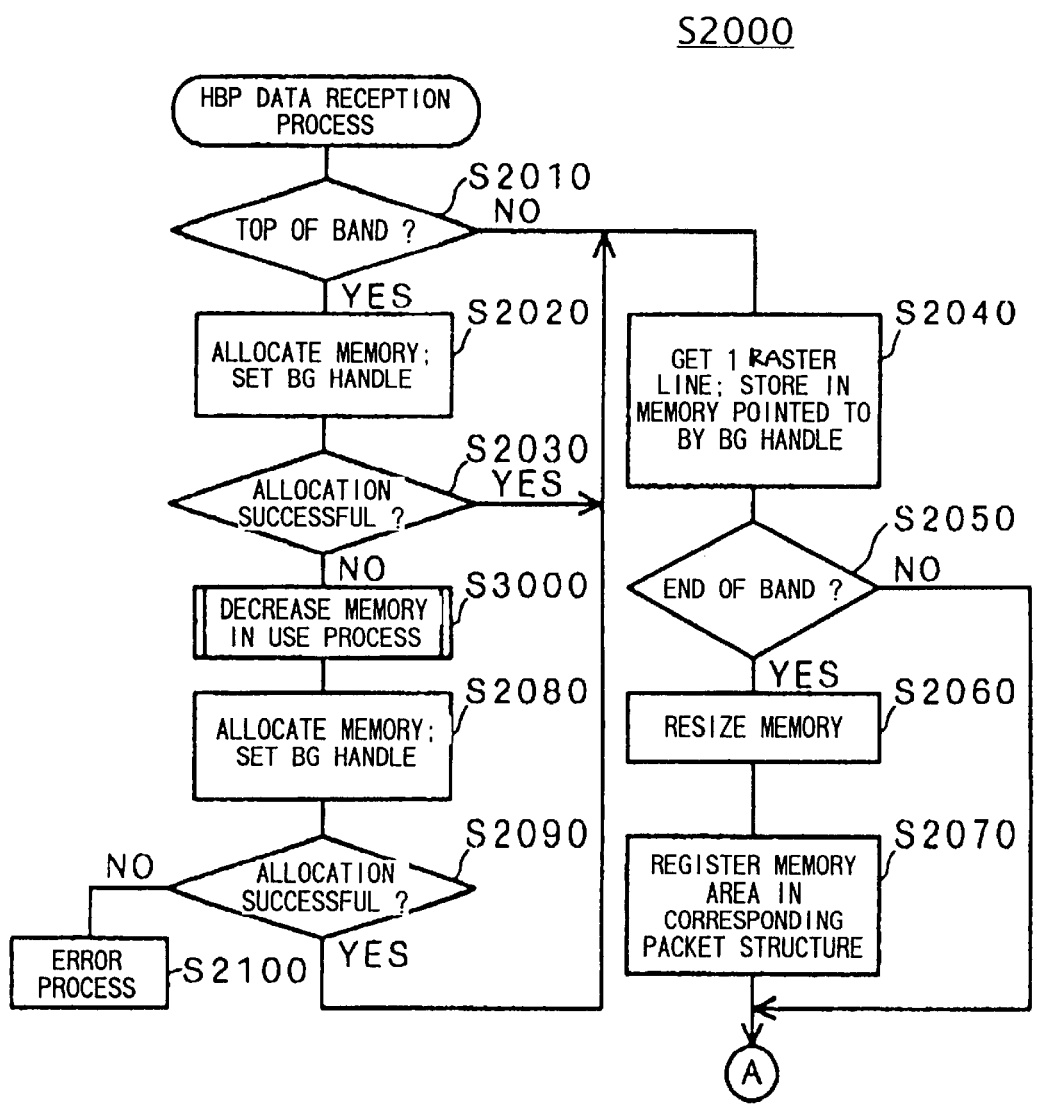
FIG. 6 is a flowchart showing a host-based data reception process executed in the laser printer.

When the host-based data reception process is started, as shown in FIG. 6, the CPU 12 first determines in S2010 whether or not the received graphics data (bitmap data) is for the top raster line in a present band. When the received bitmap data is for the top raster line of the present band ("yes" in S2010), the CPU 12 prepares, in the RAM 16, a bitmap memory area whose amount of size being equal to the maximum area size for storing one band's worth of bitmap data. Then, the CPU 12 sets a background (BG) handle to indicate the thus prepared bitmap memory area in S2020. The background handle is set in a packet structure (described later), and will be used for managing the thus prepared bitmap memory area. Then, the CPU 12 judges in S2030 whether or not the bitmap memory area is successfully prepared in the RAM 16. When the bitmap memory area is successfully prepared ("yes" in S2030), the present raster line's worth of bitmap data is received in S2040 and stored in the bitmap memory area indicated by the present background (BG) handle.

Next, the CPU 12 judges in S2050 whether or not the bitmap data which has been just received in S2040 is for the last raster line in the present band. When the bitmap data is not for the last raster line of the present band ("no" in S2050), then the process returns to S210. Then, the program proceeds from S210 through S1040 to S2010. At this time, the bitmap data is not for the top raster line of the present band ("no" in S2010). Because the bitmap memory area has already been prepared for the present band in S2020, the bitmap data for the present raster line is directly stored in S2040 in the bitmap memory area as presently indicated by the BG handle. Thus, while the processes from S210 through S1040 and S2010 toward S2040 are repeatedly performed, a successive series of raster lines' worth of bitmap data within the present band are processed and stored in the bitmap memory area.

When the presently-received bitmap data is for the last raster line of the present band ("yes" in S2050), then all the bitmap data corresponding to the present band has been received. Therefore, a memory resizing process is performed in S2060 to make available, for later use, any unused memory area in the already-prepared maximum sized bitmap data memory. That is, the size of the bitmap memory area is changed from the already-set maximum size into an actual size where the bitmap data of the present band is actually stored. Next, in S2070, data for the thus resized bitmap memory area, such as the top address and the total number of bytes in the resized memory area, is registered in a background area for the present band of a packet structure prepared for the entire image. It is noted that the packet structure is prepared in the RAM 16 for the present page, and is for storing information on all the several bands of the present page. For each band, the packet structure is for storing: data indicative of the size and location of a bitmap memory area which stores bitmap data for the present band; a BG handle indicative of a memory area for the bitmap data of the present band; and data indicative of respective characters (font data) to be printed in the present band. In S2070, therefore, the amount of the resized bitmap memory area for the present band is stored in the packet structure at a location for the present band.

Then, the entire process described above is repeated from the top of the next band. In this way, an appropriate amount of a bitmap memory area is allocated for each band of the entire image, and a process is performed to register the data of the bitmap memory area in the packet structure. The above-described operation of the HBP data reception process of S2000 is repeatedly performed as long as the bitmap data remains in the section D2 of FIG. 10.

As the HBP data reception process of S2000 is repeatedly performed, there is a possibility that an amount, of a remaining memory area in the RAM 16 for storing the newly-received band's worth of bitmap data, becomes insufficient. That is, there is a possibility that the amount of the remaining memory area, not yet used in the RAM 16, becomes smaller than the maximum memory size required to store one band's worth of bitmap data. In this case, it becomes impossible to prepare a bitmap memory area for a newly-received one band's worth of bitmap data. Accordingly, the judgment in S2030 becomes negative ("no" in S2030). In this case, a process of S3000 is performed to increase the amount of the memory area available for storing the newly-received bitmap data. This process will be described later with reference to FIG. 7.

Following the process of S3000, an attempt is made again in S2080 to prepare a bitmap memory area of the maximum size for storing the newly-received band's worth of data and to set a BG handle. If the memory is prepared in S2080 successfully ("yes" in S2090), the process continues from S2040 in the same manner as described above. If the memory is not prepared again in S2080 ("no" in S2090), on the other hand, an error process is executed in S2100. That is, the printer 2 may perform an error indication on the LED lights 22b, may sound an alarm buzzer, or may print data received prior to the occurrence of the present error.

In this way, when all the graphics data in D2 of FIG. 10 is processed and stored, the first byte of the PDL language expression data in D3 is read in S210. The PDL language expression data includes at least one set of font data to be printed on the entire image; a line feed code indicating to move printing position to a next line; and an escape sequence indicative of a font setting command.

It is noted that the first set of data in the PDL language expression data series is an escape sequence indicative of a font setting command ("yes" in S220). Accordingly, the escape sequence process is executed in S1000, and a font indicated by the presently-received escape sequence is set in S1050. Then, the program returns to S210. It is noted that the subsequently-received font data is treated as the same font until a new escape sequence of a font setting command is received.

It is assumed that a set of data received next to the escape sequence is font data (character data). In this case, the judgment in S220 is negative, and the received data is checked for a line feed (LF) code in S230. If the data is an LF code ("yes" in S230), a cursor position moving process is executed in S240 to move the printing position of the laser printer 2 to the next line. In this case, because the presently-received data is font data and not an LF code ("no" in S230), the data is checked for the print command "FF" in S250. Because the data is not "FF" ("no" in S250), the value of the data is then checked for a NULL value in S260. Because the data is not NULL ("no" in S260), a character indicated by the font data is registered in S270 as registration data in the packet structure. That is, data such as a character code, a font type, and a print position coordinate of the character, indicated by the font data, is registered in the packet structure at a location corresponding to a band in which the subject character is to be printed.

Next, the CPU 12 judges in S280 whether or not the registration process of S270 is performed successfully. That is, the CPU 12 judges whether or not the packet structure has a sufficient amount of memory area and therefore the data of the character is properly stored in the packet structure. If the process is performed successfully ("yes" in S280), then the process beginning from S210 is repeated. That is, data received next to the present font data is processed. On the other hand, if the process is not successful due to the insufficient memory area ("no" in S280), the process is executed in S290 to increase a memory area available for sufficiently storing the present packet structure. This process is the same as the process of S3000 as will be described later with reference to FIG. 7.

Next, a second attempt is made in S300 to register the present character in the packet structure, and again a check is made in S310 to determine whether the registration process is performed successfully. If the process is performed successful ("yes" in S310), then the process beginning from S210 is repeated. On the other hand, if the process is not successful ("no" in S310), then an error process is performed in S320. This error process is performed in the same manner as in S2100.

Figure 7:
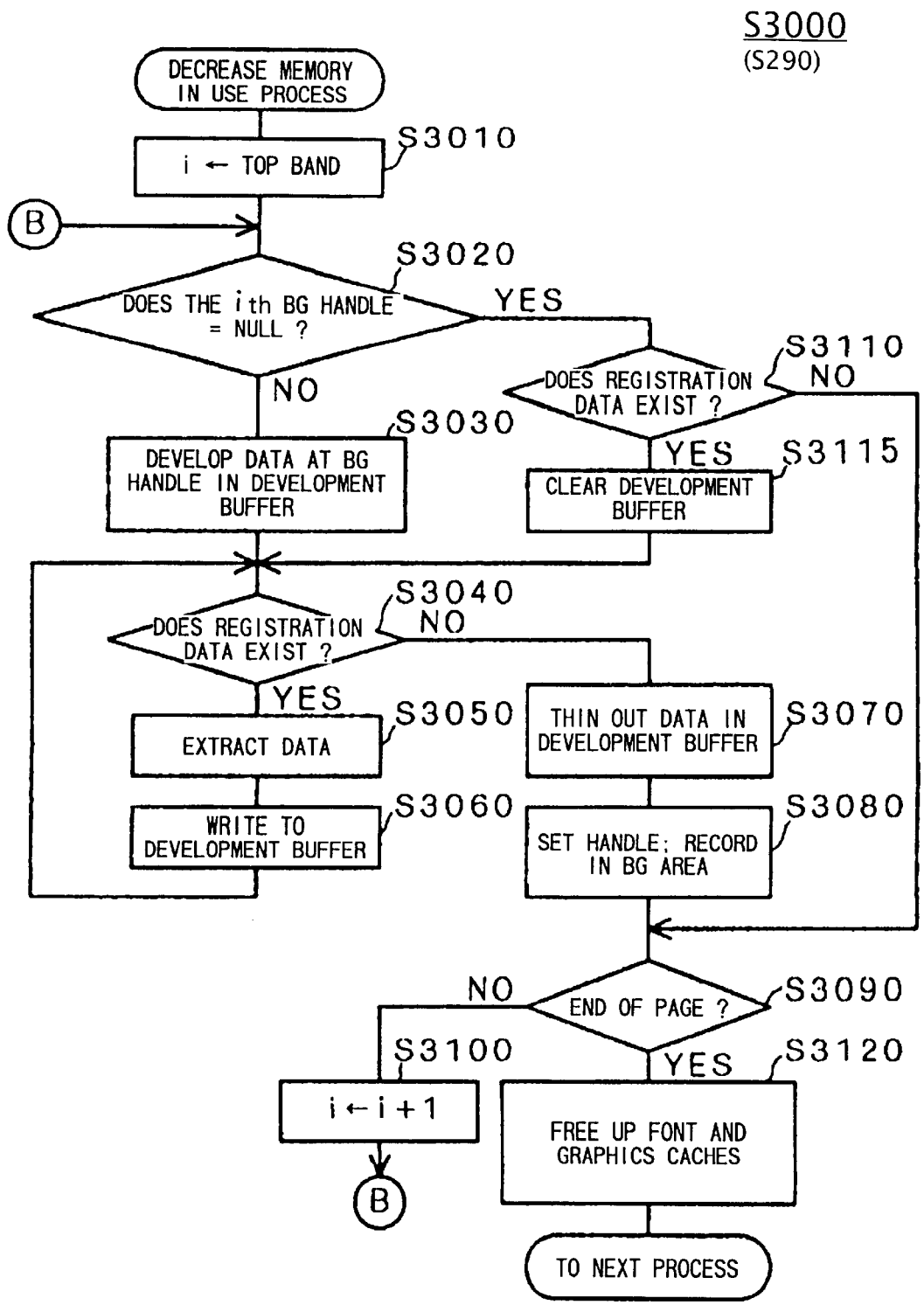
FIG. 7 is a flowchart showing a process to increase available memory executed in the laser printer.

Next, the processes of S3000 and S290 will be described. Each of these processes is performed as shown in FIG. 7. Each of these processes is designed for decreasing the amount of memory areas in the RAM 16 as being occupied with the already-received bitmap data and font data. When the process of FIG. 7 is attained as S3000, the process can increase the amount of the memory area available for preparing a bitmap memory area for newly-received one band's worth of bitmap data. When the process is attained as S290, on the other hand, the process can increase the amount of the memory area available for registering a newly-received font data in the packet structure.

First, in S3010 an index variable i indicating the order of bands beginning from the top is set to the number of the top band, for example, zero (0). Next, the CPU 12 judges in S3020 whether a BG handle corresponding to the i-th band equals NULL, that is, whether a BG handle has not been set for the i-th band. It is noted that a BG handle for the i-th band is set to the value NULL only when there exists no graphics data (bitmap data) in the area D2 for the i-th band and therefore the process of S2020 is not performed for the i-th band. If some graphics data (bitmap data) from the area D2 is for the i-th band and has already been received and stored in a memory area indicated by the BG handle, the judgment of S3020 becomes negative. Accordingly, in S3030, the graphics data (bitmap data) for the i-th band is retrieved from the memory area indicated by the BG handle, and is decompressed or expanded in a development buffer which is prepared in the RAM 16. On the other hand, if the BG handle equals NULL ("yes" in S3020), it is determined that no graphics data (bitmap data) is received for the i-th band. In this case, the CPU 12 judges in S3110 whether or not there exists any registration data for PDL language expression data in the packet structure at a location corresponding to the i-th band. If such language expression data has been registered in the packet structure at the i-th band corresponding location ("yes" in S3110), then the development buffer, prepared in the RAM 16, is cleared in S3115 to create a blank or white background bitmap image.

Thus, the process of either S3030 or S3115 is performed for preparing background bitmap image for the i-th band in the development buffer. Then, in S3040, the CPU 12 judges whether or not any registration data for PDL language expression data (font data) exists in the packet structure at the location corresponding to the i-th band. If such language expression data has been registered in the packet structure at the i-th band corresponding location ("yes" in S3040), the language expression data is retrieved in S3050 from the packet structure. In S3060, the language expression data (font data) is rasterized or converted into bitmap image data, and then written into the development buffer. The thus newly-created bitmap data represents one or more characters to be printed on the i-th band over the background bitmap image already formed on the development buffer. Thus, the newly-created bitmap data is written over the background bitmap data already stored in the development buffer. Hence, the PDL language expression data now in the bitmap data is combined with the background-representing bitmap data.

The processes of S3040–S3060 are repeated as long as some PDL language expression data remains registered in the packet structure for the i-th band. When there remains no more language expression data registered in the packet structure at the i-th band location ("no" in S3040), the program proceeds to S3070. In S3070, the CPU 12 performs to thin out the bitmap data now prepared in the development buffer. In other words, the CPU 12 performs a process of S3070 to lower the resolution of the i-th band image and decrease the amount of data in the i-th band. The amount of the already-stored data is reduced in this way, and the amount of a memory area available for storing the newly-received data is increased. Then, in S3080, all the i-th band data is registered in the background (BG) area of the packet structure at the i-th band location. Then, the BG handle is reset to indicate the area, in the BG area, where the i-th band data is now stored, the amount of which is now decreased. The BG handle is set also in the packet structure at the i-th band location.

Next, in S3090, the CPU 12 judges whether or not the present band (i-th band) is at the end of the page. It is noted that when the BG handle is equal to the value of NULL in S3020 and no language expression data is registered in S3110, it is confirmed that no bitmap data and no language data is stored for the i-th band. Therefore, the process of S3090 is executed directly after S3020 without writing any data to the development buffer. When all the bands on one page have not yet been processed ("no" in S3090), i is incremented in S3100, and the process described above is repeated from S3020 for the next band.

On the other hand, when an entire page has been processed ("yes" in S3090), then the CPU 12 erases in S3120 a graphics cache, which has been stored in the RAM 16 along with the graphics data (bitmap data) that has been developed into the development buffer. The CPU 12 also erases a font cache, indicative of font formats, which has been stored also in the RAM 16 along with the PDL font data that has been developed into the development buffer. The CPU 12 thus makes the memory areas for the graphics cache and the font cache available for storing newly-received data.

Thus, by thinning out the contents of the development buffer in S3070 and by making the font and graphics caches available for later use in S3120, a part of the memory area previously being used for the previously-received data is now added to the memory area available for storing newly-received data. If this process sufficiently increases the available memory area, the second trial in S2080 or in S300 results in successful.

When all of the language expression data in D3 is processed, a printing command "FF" is obtained in S210. The program proceeds from S210 via S250 ("yes" in S250) to S4000. The printing command "FF" is indicative of the end of the present page of data. Accordingly, in S4000, a process for unregistered data is executed as shown in FIG. 8.

When bitmap data of the HBP format does not exist at the end of a certain band, the processes of S2060 and S2070 in FIG. 6 are not executed. Accordingly, the bitmap memory area resizing operation of S2060 or the resized memory area data registering operation of S2070 has not been performed for that band. The process of FIG. 8 is therefore provided to resize the bitmap memory area for the certain band and to register the resized area data in the packet structure for the band before the printing process is executed.

Figure 8:
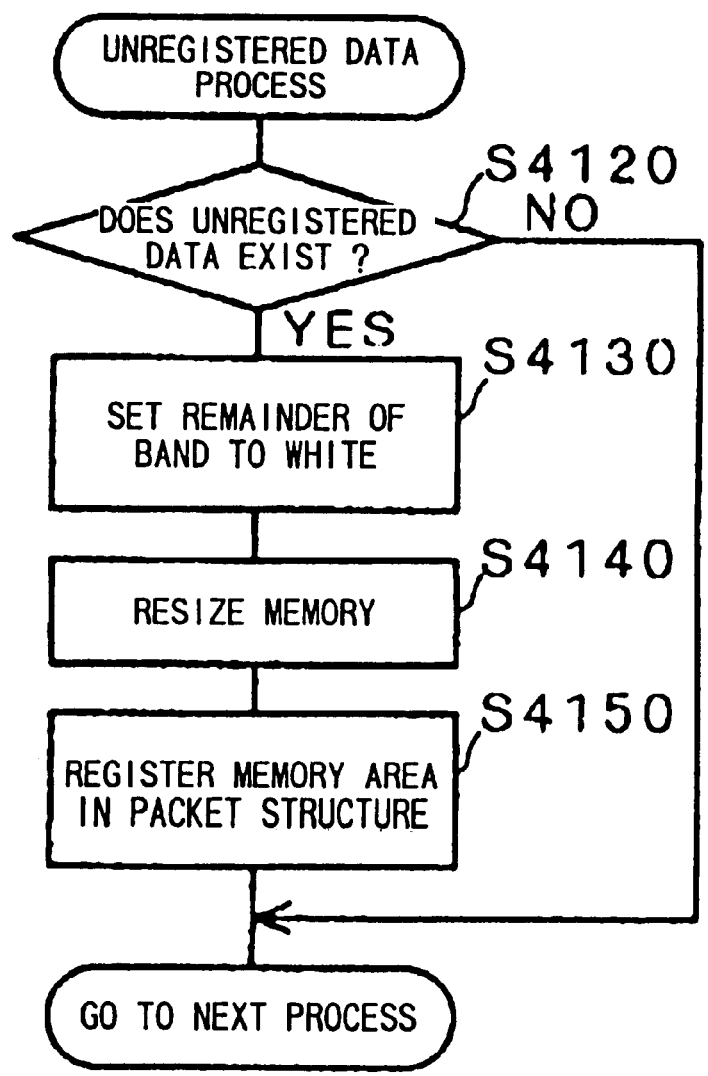
FIG. 8 is a flowchart showing an unregistered data process executed in the laser printer.

At the beginning of the unregistered data process of FIG. 8, the CPU 12 judges in S4120 whether or not there exists any unregistered bitmap memory areas in the packet structure. This judgment is performed through searching the background (BG) area of the packet structure to judge whether or not data of bitmap memory areas for any band areas is not registered in the BG area. If data of bitmap memory areas for all the bands are properly registered in the packet structure, that is, there exists no unregistered data ("no" in S4120), this process is ended, and the printing process is executed in S330. On the other hand, if data of bitmap memory areas for some bands are not registered in the packet structure, that is, there exits some unregistered data for some bands ("yes" in S4120), the program proceeds to S4130. In S4130, the CPU 12 searches the bitmap memory area for each of the unregistered bands. The CPU 12 then sets, to white background bitmap data, remaining raster lines where no bitmap data is stored in the corresponding bitmap memory area. Next, the memory is resized in S4140. This resizing process is exactly the same as the process in S2060 described above. Next, the resized memory area is registered in the packet structure in S4150. This process is the same as the process in S2070 described above.

Next, three development buffers are prepared in the RAM 16. Then, three successive bands of data, recorded in the packet structure, are developed in the three development buffers. The manner of developing the data into the development buffers is the same as that employed during developing processes from S5050–S5110 as will be described later. Then, a first raster line's worth of data is retrieved from a first one of the three development buffers and written to a FIFO (first in and first out) buffer for laser output. Then, execution of a printing process interrupt is enabled in S330, thereby starting the engine 20.

Figure 9:
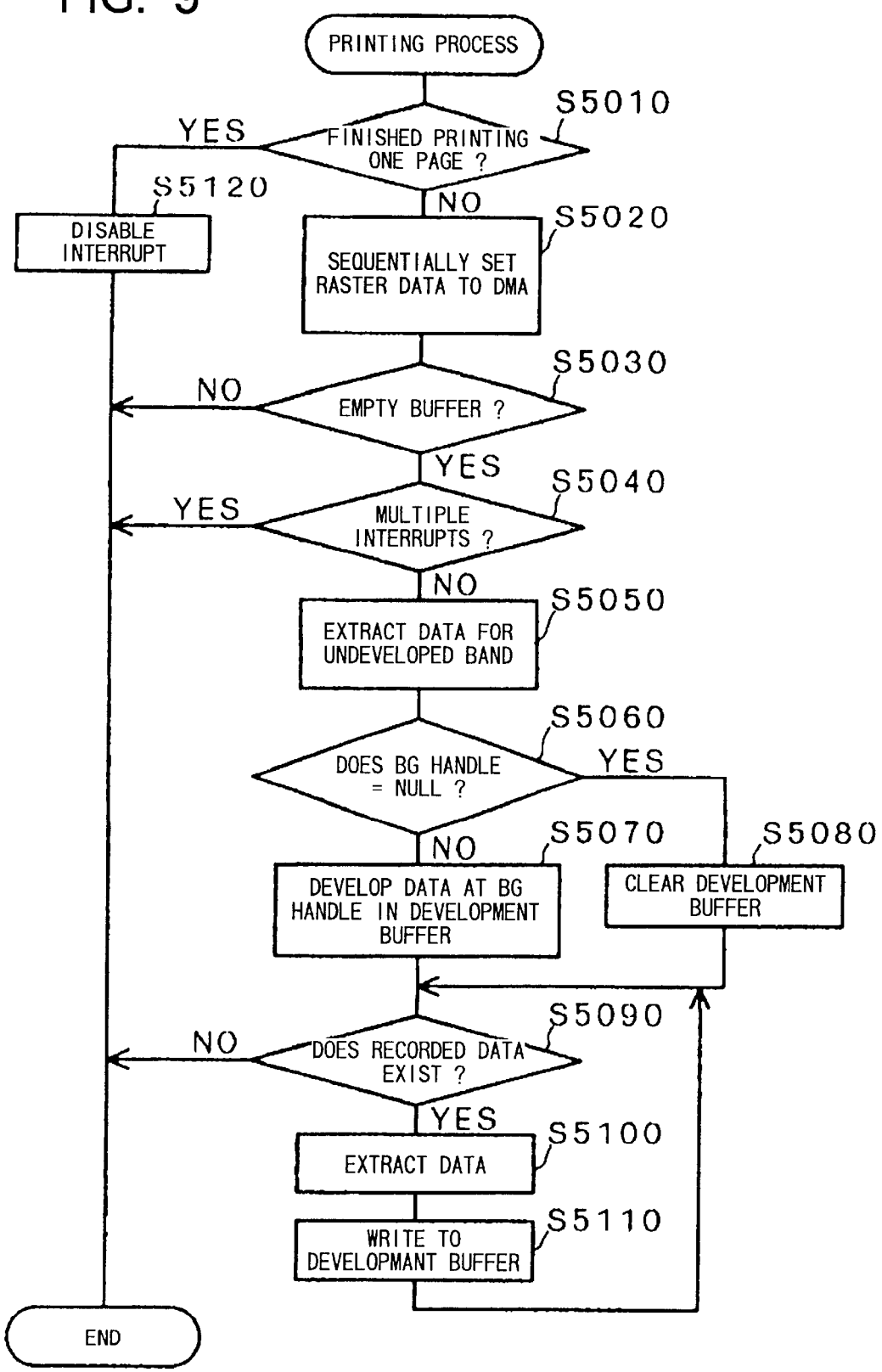
FIG. 9 is a flowchart showing a printing process executed by the laser printer.

The flowchart in FIG. 9 shows the interrupt routine of the printing process. This interrupt routine is executed every time printing of one raster line is completed by a direct memory access controller (DMAC) with data from the FIFO buffer, and the FIFO buffer becomes empty. The printing of one raster line is performed through controlling a laser diode, for example, mounted to the engine 20 based on the corresponding raster line's worth of data from the FIFO buffer. It is noted that every raster line's worth of data is outputted from the FIFO buffer in synchronization with a beam detection signal, which is emitted from the engine 20 when a sensor provided to the engine 20 detects that the laser beam reaches a predetermined position.

When the interrupt is enabled in S330, every time a beam detection signal is outputted from the engine 20, one raster line's worth of data is outputted from the FIFO buffer. As soon as the FIFO buffer becomes thus empty, an interrupt of FIG. 9 is called. First, it is determined in S5010 whether one page of data has been printed. Because the printing process has just begun, one page has not yet been printed ("no" in S5010). Then, one raster line's worth of data now stored in the development buffer for the first band is set for the DMA processing in S5020. By doing this, the next raster line's worth of data will be printed the next time a beam detection signal is issued. Next, it is determined in S5030 whether any empty development buffer exists. When there are no empty development buffers ("no" in S5030), the interrupt process is ended temporarily. After one raster line's worth of data is completely printed, an interrupt routine of FIG. 9 is called again, and the next raster line's worth of data is set for the DMA processing in S5020.

Accordingly, the determination in S5030 will be negative until the entire development buffer for the first band is printed. Only the process in S5020 is repeatedly performed to sequentially print successive raster lines of the first band. When all the raster lines in the development buffer for the first band is printed, on the other hand, an empty buffer is created. Accordingly, the judgment of S5030 becomes affirmative. Similarly, if an empty development buffer exists from the beginning, the judgment of S5030 also becomes affirmative. In such cases, the CPU 12 judges in S5040 whether or not multiple interrupts are being performed. When two or more interrupts are being performed in this process ("yes" in S5040), it can be assumed that processes beginning from S5050 are being executed simultaneously with the processes of S5020. At the present stage when printing of the first band has just been completed, the processes beginning from S5050 should not be performed. Accordingly, the current process is ended temporarily.

When multiple interrupts are not being performed ("no" in S5040), on the other hand, the program proceeds to S5050 where registration data for a band, which has not yet been developed in any of the three development buffers, is retrieved from the corresponding location of the packet structure in S5050. Because the total number (three in this case) of the development buffers is smaller than the total number of bands in the entire image, not all of the bands are developed simultaneously in the development buffers. Hence, the processes beginning from S5060 are performed to develop data of an undeveloped band into a development buffer that has become empty after its contents were completely printed. It is noted that even when this developing process is being performed, multiple interruption is attained to perform the process of S5020 wherein printing continues with data already developed in other development buffers that have not yet been completely printed.

At the beginning of the development process, the CPU 12 judges in S5060 whether or not a BG handle for the retrieved band has a value of NULL. If the BG handle is not equal to NULL ("no" in S5060), then the contents of a memory area pointed to by the BG handle is developed in the empty development buffer in S5070, thereby creating bitmap data for the background image. If the BG handle is equal to NULL ("yes" in S5060), on the other hand, the empty development buffer is cleared in S5080, thereby creating a white background image.

Next, the CPU 12 judges in S5090 whether there exists any language expression data registered in the packet structure for the retrieved band. If no such registration data exists ("no" in S5090), the development process is ended, and the current printing process is also temporarily ended. On the other hand, if some language expression data exists registered ("yes" in S5090), the registration data is retrieved in S5100. Then, in S5110, the thus retrieved language expression data is rasterized or converted into bitmap data. The thus newly-created bitmap data is written over the bitmap background data already stored in the development buffer. When this process has been executed for all of the registered language expression data, leaving no registration data left to process ("no" in S5090), then the printing process is ended temporarily.

In this way, successive bands' worth of registration data stored in the packet structure is developed sequentially into the development buffers, while successive raster lines' worth of data is printed sequentially from the development buffers. When one page of printing is completed ("yes" in S5010), interrupts for this printing process are disabled in S5120, and the printing process is ended.

Thus, printing for each page is performed according to the above-described processes every time a printing command "FF" is obtained.

It is noted that when the graphics compression mode indicated by the escape sequence is not equal to HBP ("no" in S1040) in FIG. 5, graphics data in the form of the PGL language is received in S1045. This step allows the printer 2 to receive graphics data described in language expressions from the computer 4 when the computer 4 executes a printer device driver other than that of FIG. 3.

Further, when the command indicated by the escape sequence is determined in S1020 to be a cursor movement command, a cursor movement process is executed in S1025 for moving the printing position.

As described above, according to the present embodiment, the printer driver in the computer 4 receives print data from an application software program. When the received print data is font data, the printer driver transmits the font data to the printer 2. When the print data is other than font data, but is vector data, for example, the printer driver converts the received data into bitmap data of the host-based-type format. The printer driver then transfers the converted print data to the printer 2. In the printer 2, when the received print data is bitmap data, information on the bitmap data is registered in a packet structure, and is then set in a development buffer. When the received print data is font data, on the other hand, the font data is registered in the packet structure. The font data is then developed into bitmap data, and then combined with the bitmap data already set in the development buffer. Thus, composite bitmap data is created and printed out.

In the above-described embodiment, according to the printer driver process of FIG. 3, the personal computer 4 transfers font data as described in the PDL language to the laser printer 2. The personal computer 4 transfers all data other than the font data to the laser printer 2 as bitmap image data in the HBP format. Therefore, data of a type requiring a large amount of processing to create bitmap data, such as vector graphics described in the PDL language, is transmitted as HBP bitmap image data. When the HBP bitmap data is transmitted as non-compressed data, the printer 2 can use the received data without performing any conversion processes onto the received data. Even when the data is transmitted as compressed data, the printer 2 can use the received data through merely decompressing or expanding the received data. It becomes unnecessary for the printer 2 to perform any complicated conversion process from language expression data into bitmap data. Accordingly, the laser printer 2 is not burdened with a large processing load that requires a long period of time. Accordingly, the printing process will not be slowed down, nor will the process in the personal computer 4 be delayed.

The laser printer 2 can be cooperated with any computers which do not employ the printer driver of FIG. 3. The laser printer 2 can develop and combine together its received data in development buffers (print data areas) even if all the print data transmitted from the personal computer 4 is language expression data. The laser printer 2 can also develop and combine together its received data in development buffers even if all the print data transmitted is HBP bitmap image data. Hence, the printer 2 can print even print data sent from a computer of a conventional data transmission system. In this case, the computer 4 compresses the print data (bitmap data) in a conventional compression method employed in the conventional host-based type printers. The printer 2 decompresses or expands the received bitmap data in a decompression method employed in the conventional host-based type printers.

The conventional host-based-type printers receive bitmap image data at a hardware logic circuit and prints the received data. Contrarily, the laser printer 2 of the present embodiment performs the data receiving operation according to the software program of FIGS. 4 through 9 even when the host-based-type bitmap image data is transmitted. That is, the laser printer 2 temporarily stores the received bitmap image data in the bitmap memory area. When the size of the memory area available for newly-received bitmap data becomes low, the already received-and-stored data is developed through the software process in the development buffer, and the data in the development buffers are thinned out, lowering the resolution. It therefore becomes possible to prevent occurrence of such cases in which the received image cannot be printed due to an insufficient memory area. Furthermore, both of the host-based-type bitmap image data and language expression data can be arranged together in the print data area (development buffer). Both types of data can be managed as data having the same format using the packet registration area. Therefore, programs for managing or processing the both types of data can be made universal, reducing the amount of memory required for storing the programs.

The function of the laser printer 2 that is described in the flowcharts of FIGS. 4 through 9 is provided in each device as programs to be executed by the printer 2. Data of the program of FIGS. 4 through 9 is originally stored in such a storage medium as the ROM 16, and this ROM is incorporated in the laser printer 2, which is used as a computer system.

Similarly, the function of the personal computer 4 (print data transmission device) that is described in the flowchart of FIG. 3 is provided in the computer 4 as a program executed by the computer 4. Data of the program of FIG. 3 is originally stored in a storage medium 33 such as a floppy disk, a magneto-optical disk, or a CD-ROM and is loaded down in the computer 4 and executed when needed.

As described above, the printing device 2 of the present embodiment is designed as capable of receiving, from an external source such as the computer 4, print data in the form of both language expression data which describes images in a language (PDL language) and either compressed or uncompressed bitmap image data expressing images with bitmap images. According to the printing device 2, a packet registration area is prepared for managing the received print data in the form of both the language expression data and the bitmap data in each of all the specified print areas (bands) of an entire image. The language expression data for each band is registered in S270 in a corresponding packet registration area. In S5070, the bitmap image data for each print area (band) is written into a print data area (development buffer) associated with the packet registration area. In S5110, the language expression data recorded in the packet registration area is converted into bitmap data and written into the same print data area (development buffer). The language expression data is thus converted and stored in the development buffer at a prescribed time when a print command is received. Then, in S5020, the bitmap image data now combined and stored in the print data area (development buffer) is printed.

With this configuration, not only the language expression data but also the bitmap image data are stored together in the print data area (development buffer). Language expression data of a type, such as language expression data described in vectors and the like, which requires a large load of processing to convert the data into bitmap image data, is transmitted from the external source as host-based-type bitmap image data. If the host-based-type bitmap image data is uncompressed, the printer 2 can use the received bitmap data as is. If the host-based-type bitmap image data is compressed, on the other hand, the printer 2 can merely expand or decompress the received data before using the data. The load on the printing device is not high, and no time is wasted on processing. Because printing delay is prevented, processing delays are not caused also in the transmission side. Also, speed is not lost in the host computer because the host computer is generally provided with an internal high-speed graphics accelerator.

When data received from the external source consists entirely of language expression data, all of the data can of course be developed in the print data area (development buffer) in S5110, and printed in S5020. Further, if all the data is received in the form of the host-based-type bitmap image data, on the other hand, all of the data can be written to the print data area (development buffer) in S5070. Therefore, all print data, even print data transmitted from conventional transmission systems, can be printed in S5020.

The processes of S280 and S3070 and the processes of S2030 and S3070 are performed for increasing the amount of a memory area available for storing newly-received print data. Those processes are designed to decrease the resolution of print data as prepared in the print data areas. The processes are performed when the memory area available for the packet registration area is insufficient or is anticipated to be insufficient or when a memory area for storing bitmap data in association with the packet registration area is insufficient or is anticipated to be insufficient. With this configuration, print data received from the external source in the form of the host-based-type bitmap image data will be written in S5070 to the print data area, while the language expression data will be developed in S5110 into bitmap data and written into the same area.

When there remains insufficient memory area, the bitmap data as prepared in the print data areas is compressed again to create more available memory area, and the available memory is expanded for use by the packet registration areas and by the memory areas for the bitmap image data. This process, which is performed in the conventional intelligent-type printing devices, is thus performed also for the host-based-type bitmap data according to the present embodiment. It is therefore possible to prevent occurrence of such cases in which images cannot be printed due to an insufficient memory area. Further, since both the host-based-type bitmap image data and the language expression data are written to the print data area and are managed by the packet registration areas as the same data format, programs for performing the print control and processing can be simplified, effectively decreasing the amount of memory required for such programs.

In addition, according to the present embodiment, the print data transmission device (such as the personal computer 4) is designed capable of receiving print data from an application program (such as a word processor program, a CAD program, or a table calculation program) and capable of transmitting, to a printing device (such as the printer 2), the print data in the form of language expression data which is described in a language. In S110 and S130, the print data transmission device transmits print data received from the application program as compressed or uncompressed bitmap image data, even if the print data can be expressed as language expression data, if the print data is of a type, such as the language expression data described in vectors, that causes development thereof into bitmap data would place a high load on the printing device.

When the print data transmission device has the above-described structure, the functions described above for the printing device can be effectively attained. It is possible to decrease the overall load in the printing process, achieving fast printing without delaying the host process. For example, the print data transmission device transmits print data, represented in vectors and capable of being described in a language, to the printing device as compressed or uncompressed bitmap image data because developing such type of print data into bitmap data would place a high load on the printing device.

When transmitting compressed bitmap data, various compression methods can be used. It is possible to use the compression method for bitmap data that is performed in the conventional host-based-type transmission system to transmit all images as bitmap image data.

Functions for both the printing device and the print data transmission device described above are included as programs that are executed on computer systems provided in the devices. These programs can be stored in floppy disks, magneto-optical disks, CD-ROMs, and other storage media. When needed, the programs can be loaded into the computer system and started. In addition to the above storage media, a ROM and a backup RAM can be incorporated in the computer system for storing the programs.

While the invention has been described in detail with reference to the specific embodiment thereof, it would be apparent to those skilled in the art that various changes and modifications may be made therein without departing from the spirit of the invention.

What is claimed is:

1. A print data transmission device for transmitting print data to a printing device, the print data transmission device comprising:
an input device that receives print data issued from an application program;
a transmission device that transmits the print data in the form of language expression data describing images in a language and bitmap data expressing images with bitmap images to the printing device;
a judge device that judges whether the received print data comprises a predetermined type;
a converting device the selectively converts the received print data into bitmap data when the print data comprises other than the predetermined type;
a memory that temporarily stores the selectively converted bitmap data; and
a transmission control device that controls the transmission device to transmit, to the printing device, the selectively converted bitmap data and the predetermined type data in a form of language expression data.

2. The print data transmission device of claim 1, wherein the judging device judges that said received print data represented in vectors and capable of being described in a language is other than the predetermined type.

3. The print data transmission device of claim 1, wherein the predetermined type comprises font data.

4. The print data transmission device of claim 1, wherein the transmission device comprises a compression device that compresses the bitmap data into compressed bitmap data, wherein the transmission control device further controls the transmission device to compress the bitmap data into compressed bitmap data and to transmit the compressed bitmap data to the printing device.

5. A program storage medium for storing instructions for controlling a print data transmission device to transmit print data to a printing device, the instructions comprising:
instructions for receiving print data issued from an application program;
instructions for judging whether the received print data is a predetermined type;
instructions for selectively converting the received print data into bitmap data when the print data is other than the predetermined type;
instructions for temporarily storing the selectively converted bitmap data; and
instructions for transmitting the selectively converted bitmap data and the predetermined type data in a form of language expression data to the printing device.

6. A print data transmission device for transmitting print data to a printing device, the print data transmission device comprising:
an input device that receives print data issued from an application program;
a transmission device that transmits the print data in a form of language expression data describing images in a language and bitmap data expressing images with bitmap images to the printing device;
a judging device that judges whether the received print data is font data;
a converting device that selectively converts the received print data into bitmap data when the print data comprises other than the font data;
a memory that temporarily stores the selectively converted bitmap data; and
a transmission control device that controls the transmission device to transmit the selectively converted bitmap data and the font data in a form of language expression data.

7. The print data transmission device of claim 6, wherein the transmission device converts the non-converted font data into page description language data and transmits the page description language data to said printing device.

8. The print data transmission device of claim 6, wherein the memory device temporarily stores the selectively-converted bitmap data, before the transmission control device controls the transmission device to start transmitting the print data, and wherein the transmission control device further controls the transmission device to transmit the bitmap data as a background image before transmitting the font data.

9. A printing system comprising:

a print data transmission device; and a printing device coupled to said print data transmission device, said print data transmission device comprising:
- an input device that receives print data issued from an application program;
- a transmission device that transmits the print data in a form of language expression data describing images in a language and bitmap data expressing images with bitmap images to said printing device;
- a judging device that judges whether the received print data is of a predetermined type;
- a converting device that selectively converts the received print data into bitmap data when the print data is other than the predetermined type;
- a memory that temporarily stores the selectively converted bitmap data; and
- a transmission control device that controls the transmission device to transmit the selectively converted bitmap data and the predetermined type data in a form of language expression data.

10. The printing system of claim 9, wherein the judging device judges that said received print data represented in vectors is other than the predetermined type.

11. The printing system of claim 9, wherein the predetermined type comprises font data.

12. The printing system of claim 9, wherein the transmission device comprises a compression device that compresses the bitmap data into compressed bitmap data, and wherein the transmission control device further controls the transmission device to compress the bitmap data into compressed bitmap data and to transmit the compressed bitmap data to said printing device.

* * * * *